Figure 1:
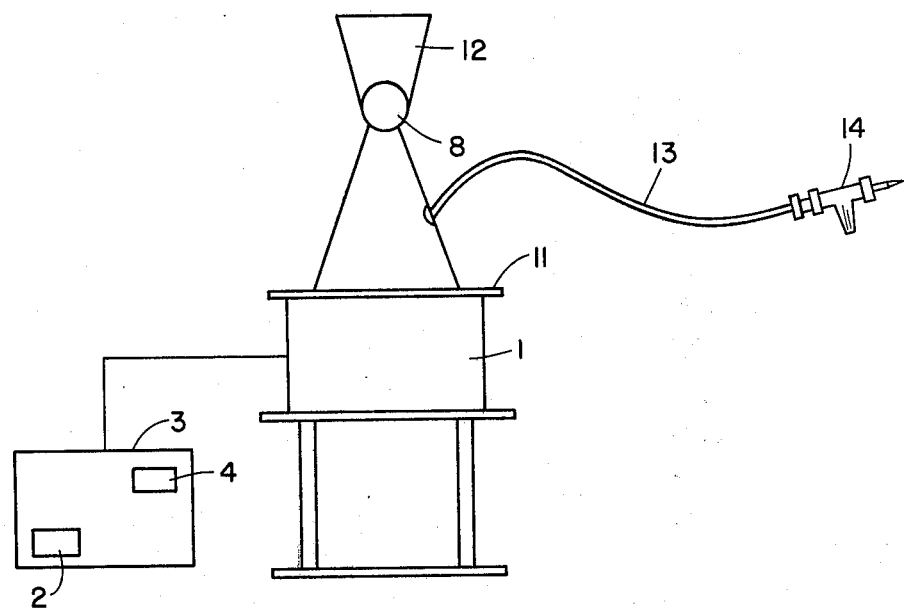

United States Patent [19]

Bösmiller

[11] 4,346,818
[45] Aug. 31, 1982

[54] ARRANGEMENT FOR THE THERMAL SPRAYING OF METAL AND CERAMIC POWDERS

[75] Inventor: Erich Bösmiller, Lohhof, Fed. Rep. of Germany

[73] Assignee: Motoren-und Turbinen-Union Munchen GmbH, Munich, Fed. Rep. of Germany

[21] Appl. No.: 114,520

[22] Filed: Jan. 23, 1980

[30] Foreign Application Priority Data

Nov. 19, 1979 [DE] Fed. Rep. of Germany ....... 2946569

[51] Int. Cl.³ .............................................. B67D 5/34
[52] U.S. Cl. ....................................... 222/58; 222/77; 177/70; 364/567
[58] Field of Search ........................... 222/52, 58, 77; 364/567; 177/70

[56] References Cited

U.S. PATENT DOCUMENTS 3,511,412  5/1970  Wolfenden et al. .................. 222/58
4,211,340  7/1980  Szakasits et al. ................. 222/58 X Primary Examiner—Joseph J. Rolla
Attorney, Agent, or Firm—Scully, Scott, Murphy & Presser

[57] ABSTRACT

The present invention relates to an arrangement for thermal spraying of metal and ceramic powders. The powders are admixed in a storage receptacle and conveyed to a spray gun for application. The storage receptacle and conveying arrangement are installed on a precision scale which provides continuous registration of the weight loss per unit time. The output of the scale is used to regulate the spraying operation to obtain an increase in the quality of the resulting work product.

3 Claims, 2 Drawing Figures

U.S. Patent    Aug. 31, 1982    4,346,818

ARRANGEMENT FOR THE THERMAL SPRAYING OF METAL AND CERAMIC POWDERS

The present invention relates to an arrangement for the thermal spraying of metal powders and ceramic powders and their admixing through a powder storage receptacle, and to arrangements for the conveyance of the powder from the storage receptacle into a spray gun.

In spraying arrangements of this type in order to achieve a uniform coating, particularly for achieving the maximum constant coating thickness, it is necessary to precisely determine the throughput of the coating powder through the arrangement. In the hitherto known arrangements, this determination of the powder throughput is carried out in the manner in which the powder is sprayed into a receiving receptacle over a precisely determined period of time, and from the weight of the receptacle prior thereto and subsequently, as well as from the measurement of the time period and corresponding division, there is then calculated an average value of the powder throughput. This method is cumbersome and time consuming and, in addition thereto, is not sufficiently precise since variations in the throughput during the measuring period cannot be determined whereby, during the coating of work pieces, there can again occur irregularities during the coating as a result of varying throughput.

Accordingly, it is an object of the present invention to so construct an arrangement of this type through which the instantaneous throughput of coating powder can be determined as precisely as possible, in which the determination of the throughput will not occasion any disruption of the operation of the installation and whereby, in addition thereto, the expenditures which are required for the determination can be held as low as possible.

In order to achieve the foregoing object, it is inventively proposed that, in an arrangement of the class described, the powder storage receptacle with the conveying arrangements be installed on a precision scale which is equipped with an arrangement for the continuous registration of the weight pursuant to presently small time intervals, and a calculating circuit in which the weight loss $\Delta G$ presently registered during a time interval is divided by the duration of the time interval $\Delta t$.

The inventive arrangement attains the foregoing object in an advantageous manner in that, without exerting any influence upon the operating procedure, the instantaneous throughput of spraying powder through the arrangement can be continually claculated and indicated. Through suitable selection of the time intervals in the range of a few seconds there can be achieved a high degree of preciseness of indication. Thereby the requirements with respect to the arrangement and circuitry are relatively low. When there is indicated an extraordinary variation in the throughput, then the spraying procedure can be intermediately interrupted, with the result that the loss quotient is substantially reduced during the coating of work pieces at a concurrent increase in the coating quality.

In a further aspect of the invention there is proposed that, as the precision scale, there is utilized a scale with an electronic display and with electronic data output. The application of such a scale has the advantage that the calculated weight can be directly employed as an electronic signal in a calculating circuit without there having to take place any conversion of the signal. Preferably, such a calculating circuit can be a microcomputer.

In a further embodiment of the invention there is proposed that a predesignated arrangement for maintaining constant the powder quantity which is sprayed for each unit of time encompasses a closed control circuit with setting means and a regulator which is in operative communication with the arrangement for conveying of the powder (adjusting element).

An arrangement which is constructed in that manner has the advantage that even upon the occurence of different disruptive magnitudes which in themselves would vary the throughput of powder, through intermediary of the closed control circuit there can be held constant the powder throughput. Moreover, it is possible that by means of the setting means there can be adjusted the desired powder throughput in accordance with the specific constructional demands.

Figure 2:
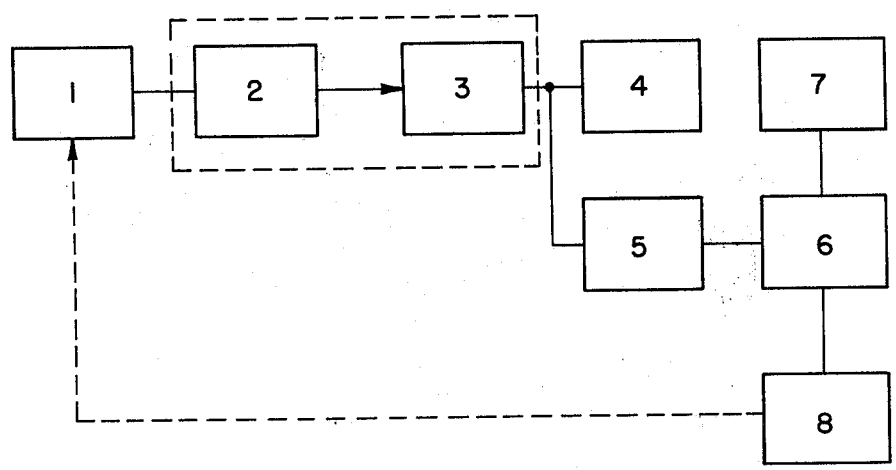

Reference may now be had to the following detailed description of the invention, taken in conjunction with the accompanying drawings; in which:

FIG. 1 shows an overall schematic view of an inventive spraying arrangement; and FIG. 2 is a circuit block diagram of a control circuit for an arrangement pursuant to FIG. 1.

Illustrated in FIG. 1 is a scale 1. A Sartorius 5815 is an example of a type of scale which can be used in the present invention. Arranged on a base plate 11 of the scale 1 is a powder storage receptacle 12, connected to which is a powder conveyor wheel 8 which conducts powder from the powder storage receptacle 12 through a conduit 13 to a spray gun 14. In a usual manner, propellent gas is employed for the conduction of the spraying powder. From the scale 1 the weight output signal is conducted to a microcomputer 3 which can, for example, be an ECB/C8 type microcomputer manufactured by Kontron Electronics Gmbh. The latter includes a display 4, typically of the Series 1700 type manufactured by Industrial Electronic Engineers, Inc. for the throughput for each unit of time and a display 2, for the total powder quantity which has been put through during a coating sequence.

In the schematic block diagram pursuant to FIG. 2, the scale is again identified with reference numeral 1. The output signal is conducted into the microcomputer 3, which encompasses a calculating circuit in which the registered weight loss $\Delta G$ is divided by the duration of the time interval $\Delta t$ within which it has occurred. Calculated thereby is the instantaneous value of the throughput of powder through the arrangement and indicated in a further display 4. Moreover, the calculated value of the instantaneous throughput is conducted through an analog converter 5 which can be a CPS type signal converter manufactured by Neumuller Messtechnik to a regulator 6 and therein compared with a reference value which is conducted from a reference value indicator 7 or setting means to the regulator 6. As a typical regulator 6 having a reference indicator 7 incorporated therein the present invention contemplates the use of a regulator Series Type 021 manufactured by Eurotherm Regulator Gmbh. The output signal of the regulator 6 leads to a drive for the powder conveyor wheel 8 (=adjusting element), by means of which there can be varied the powder throughput. The operative line leading from the powder conveyor wheel 8 to the scale 1 closes the control circuit and indicates that the weight differential $\Delta G$ for each time interval $\Delta t$ varies through the change in the conveyed quantity. The regulator 6 preferably is a PID-regulator.

What is claimed is:

1. Arrangement for the thermal spraying of metal powders and ceramic powders and their admixing through a powder storage receptacle, and arrangements for the conveyance of the powder from the storage receptacle to a spray gun, comprising the powder storage receptacle with the conveying arrangements is installed on a precision scale which includes a device for the continuous registration of a weight change of powder material in the storage receptacle per time interval, and a calculating circuit in which the weight loss $\Delta G$ presently registered during one time interval is divided by the duration of the time interval $\Delta T$; said precision scale further comprises a scale with an electronic display and an electronic data output and said calculating circuit comprising a microcomputer.

2. Arrangement as claimed in claim 1, comprising a closed control circuit including a reference value element and a regulator for maintaining constant the powder quantity sprayed for each unit of time, which is in operative connection with the arrangement for the conveyance of the powder (adjusting element).

3. Arrangement as claimed in claim 2, characterized in that the regulator is a PID regulator.

* * * * *